(12) United States Patent
Chinn et al.

(10) Patent No.: US 9,162,208 B2
(45) Date of Patent: Oct. 20, 2015

(54) PROCESS AND SYSTEM FOR PRODUCING SYNTHETIC CRUDE OIL FROM OFFSHORE PRODUCED FLUIDS CONTAINING HIGH $CO_2$ CONTENT

(71) Applicants: Daniel Chinn, Bay Point, CA (US); Gordon R. Deppe, Clayton, CA (US); Anne M. Helgeson, San Ramon, CA (US); Shabbir Husain, Emeryville, CA (US)

(72) Inventors: Daniel Chinn, Bay Point, CA (US); Gordon R. Deppe, Clayton, CA (US); Anne M. Helgeson, San Ramon, CA (US); Shabbir Husain, Emeryville, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 521 days.

(21) Appl. No.: 13/644,328

(22) Filed: Oct. 4, 2012

(65) Prior Publication Data

US 2014/0100295 A1 Apr. 10, 2014

Related U.S. Application Data

(60) Provisional application No. 61/543,255, filed on Oct. 4, 2011.

(51) Int. Cl.
*B01J 12/00* (2006.01)
*C10G 2/00* (2006.01)
*C10G 5/00* (2006.01)

(52) U.S. Cl.
CPC . *B01J 12/00* (2013.01); *C10G 2/32* (2013.01); *C10G 2/50* (2013.01)

(58) Field of Classification Search
CPC .............. B01J 12/00; C10G 2/32; C10G 2/50
See application file for complete search history.

(56) References Cited

U.S. PATENT DOCUMENTS

| | | |
|---|---|---|
| 4,597,777 A | 7/1986 | Graham |
| 5,085,676 A | 2/1992 | Ekiner et al. |
| 5,104,532 A | 4/1992 | Thompson et al. |
| 6,007,702 A | 12/1999 | Schievelbein et al. |
| 6,755,900 B2 | 6/2004 | Koros et al. |

(Continued)

OTHER PUBLICATIONS

Smith, B, at al, A Review of the Water Gas Shift Reaction Kinetics, International Journal of Chemical Reactor Engineering, 2010, vol. 8, Berkeley Electronic Press pp. 1-32.*

(Continued)

*Primary Examiner* — Renee E Robinson
*Assistant Examiner* — Derek Mueller
(74) *Attorney, Agent, or Firm* — Karen R. DiDomenicis

(57) ABSTRACT

A system and process for producing synthetic crude oil from produced fluids of an oil well is disclosed. The system comprises a separation plant for producing an associated gas stream from produced fluids a membrane unit comprising a plurality of polymer membranes to provide a $CO_2$ enriched permeate stream and a $CO_2$ depleted product gas stream, a gas conversion plant for converting the $CO_2$ depleted product gas stream into a synthetic crude oil and a heat exchanger adding heat to the associated gas stream so that the membrane unit operates at a temperature of at least 80° C. during separation of the associated gas stream using the membrane unit. A process using the aforementioned components, including separation of the associated gas stream using the membrane unit at a temperature >80° C., into a $CO_2$ enriched stream and a $CO_2$ depleted product stream, is also described.

8 Claims, 4 Drawing Sheets

(56) References Cited

U.S. PATENT DOCUMENTS

| | | |
|---|---|---|
| 6,932,859 B2 | 8/2005 | Koros et al. |
| 7,247,191 B2 | 7/2007 | Koros et al. |
| 7,825,164 B1 | 11/2010 | Kibby et al. |
| 2005/0197410 A1 | 9/2005 | Lowe et al. |
| 2006/0189702 A1* | 8/2006 | Tomlinson et al. ........... 518/726 |
| 2008/0099377 A1 | 5/2008 | He et al. |
| 2009/0159498 A1 | 6/2009 | Chinn et al. |
| 2009/0178561 A1 | 7/2009 | Miller et al. |
| 2009/0182097 A1 | 7/2009 | Miller et al. |
| 2010/0160464 A1 | 6/2010 | Kibby et al. |
| 2010/0186586 A1 | 7/2010 | Chinn et al. |
| 2011/0160315 A1 | 6/2011 | Kibby et al. |
| 2011/0240288 A1 | 10/2011 | Kibby et al. |

OTHER PUBLICATIONS

Lin, W., et al, Gas Permeability, Solubility, and Aging Characteristics of 6FDA-durene Polyimide Membranes, Journal of Membrane Science 2001, vol. 186, pp. 183-189.*

Koros and Fleming, *Journal of Membrane Science*, 83, 1-80 (1993).

* cited by examiner

PROCESS AND SYSTEM FOR PRODUCING SYNTHETIC CRUDE OIL FROM OFFSHORE PRODUCED FLUIDS CONTAINING HIGH $CO_2$ CONTENT

CROSS-REFERENCE TO RELATED APPLICATIONS

This application claims benefit to U.S. Provisional Application No. 61/543,255 filed on Oct. 4, 2011, the contents of which are incorporated herein by reference in its entirety.

FIELD OF THE INVENTION

The present invention relates generally to offshore platforms or vessels that process produced fluids from offshore wellbores, and more specifically, to those that inject associated gases separated from the produced fluids and store liquid crude aboard the platform or vessel.

BACKGROUND OF THE INVENTION

Produced fluids from many offshore hydrocarbon reservoirs contain significant amounts of carbon dioxide and other gases. For example, some fields offshore Brazil, Thailand, Indonesia and others may produce associated gas along with oil that may contain 30-40 vol % $CO_2$ or more. Consistent with regulations and laws, the oil from wells cannot be produced without proper disposal of associated gases. Pipelines to bring this gas to a nearby market may be prohibitively expensive due to the long distances required. Two current methods for disposal of associated gases are either to flare this gas and vent the flue gas to the atmosphere, or to add gas reinjection equipment on to vessel or platform on which the produced fluids are processed. The gas reinjection equipment reinjects the entire gas stream back into a subterranean reservoir. Besides losing the opportunity to monetize the associated gas along with the oil, these conventional approaches have a number of problems.

Increasingly, flaring of the associated gas stream is being banned due to environmental concerns. Second, in the case of reinjection of the associated gas, extensive compression equipment is needed, as the entire gas stream (hydrocarbons and the $CO_2$) need to be injected. Because the associated gas contains high percentages of light hydrocarbon gases ($C_1$-$C_5$), power to compress the associated gas to reach a dense phase or subcritical phase is much higher, as compared to injection of relatively pure $CO_2$. This means that the associated gases would have to be injected at a much higher pressure, which increases the cost and potential subsurface risks.

FIG. 1 illustrates an exemplary prior art system in which produced well fluids 1 from an underwater hydrocarbon production zone (C) is sent to the topsides of a FPSO (floating production, storage and offloading) vessel located in a body of water (B). The produced well fluids 1 are sent to a production separator (E) which separates out by density differences an associated gas stream (4), an oil stream (2), and a produced water stream (3). After suitable water treatment, the produced water (3) is often discharged back into the body of water (B) or reinjected back into the hydrocarbon reservoir (C) or other subterranean reservoir. The oil product of oil stream 2 is often stabilized, and then stored into the hull of the FPSO (A). Stabilized refers to the removal of light gases such $C_1$-$C_5$ gases leaving an oil product with low vapor pressure. Since there is often no available pipeline to export the associated gas stream from the FPSO to a nearby market, the gas stream (4) is either sent to a flare (F) and burned to produce a flue gas (6) or to gas injection compressors (G). Reinjected gas (8) is sent to a gas injection zone (D) that may be located underneath the hydrocarbon production zone (C).

Suggestions have been to optimize the separation of $CO_2$ from associated gases. For example U.S. patent application Ser. No. 12/361,961, entitled Process for Upgrading Natural Gas with Improved Management of Gas, suggests using crosslinked polymer membranes to effectively separate $CO_2$ from natural gas. The $CO_2$ stream may be reinjected into subterranean formations and the natural gas used such as for creating Fischer-Tropsch products. The contents of this application are hereby incorporated by reference in its entirety.

U.S. patent application Ser. No. 12/974,337, entitled Process and System for Blending Synthetic and Natural Crude Oils Derived from Offshore Produced Fluids, discloses that associated gas are separated into $CO_2$ enriched permeate stream and a $CO_2$ depleted gas product stream. The gas product stream is converted into synthesis gas (hydrogen (H2) and carbon monoxide (CO)) by gas reformers and then the synthesis gas is converted by contacting hybrid catalysts in a gas conversion reactor to produce an effluent containing water, gas and hydrocarbons which, preferably, are general free of wax products ($C_{21}$+) at ambient temperatures and conditions. The wax free product or synthetic crude oil may then be stabilized by removing light gases and blended with the natural crude oil and stored aboard a production platform or vessel. Wax typically causes numerous problems in Fischer-Tropsch operations. Accordingly, wax is often required to be cracked by way of hydrocracker unit back into liquid products at ambient conditions. However, with weight and space being a premium on an offshore platform, producing a generally wax free hydrocarbon liquid or synthetic crude oil does away with the need for such a hydrocracking unit. The contents of this application are hereby incorporated by reference in its entirety.

There are opportunities for improvements in such systems that use polymer membranes to separate $CO_2$ gas from product gases of associated gas and then use the product gas to produce synthetic crude oil suitable for storage or transport on a vessel. The present disclosure describes such improvements.

SUMMARY OF THE INVENTION

A system is disclosed for producing synthetic crude oil from produced fluids of an offshore oil well. The system comprises;
  a separation plant for producing an associated gas stream from produced fluids received from at least one offshore well:
  a membrane unit comprising a plurality of polymer membranes to provide a $CO_2$ enriched permeate stream and a $CO_2$ depleted product gas stream;
  a gas conversion plant for converting the $CO_2$ depleted product gas stream into a synthetic crude oil; and
  a heat exchanger receiving a fluid from the gas conversion plant and adding heat to the associated gas stream so that the membrane unit operates at a temperature of at least 80° C. during separation of the associated gas stream into the $CO_2$ enriched permeate stream and the $CO_2$ depleted product gas stream;
  wherein the system is disposed at an offshore location.

The polymer membranes ideally comprise a crosslinked polyimide polymer having covalent ester crosslinks and having a $CO_2$ permeance of at least 20 GPU and a $CO_2/CH_4$ selectivity of greater than 20, at 35° C. and a feed pressure of 100 psia.

A process for producing synthetic crude oil from produced fluids of an offshore oil well. The process comprises:

- separating an associated gas stream from produced fluids received from at least one offshore well;
- adding heat to the associated gas stream;
- separating the heated associated gas stream using a membrane unit comprising a plurality of polymer membranes to provide a $CO_2$ enriched permeate stream and a CO2 depleted product gas stream; and
- converting at least a portion of the $CO_2$ depleted gas product stream into a synthetic crude oil using the gas conversion plant at an offshore location.

It is an object of the present invention to provide a membrane unit, utilizing polymer membranes, which operates at a relatively high temperature and flux such that the overall size and weight of the membrane unit may be minimized with respect to separating a predetermined volume of an associated gas stream into a $CO_2$ depleted product gas stream and a $CO_2$ enriched retentate stream.

It is yet another object to supply waste heat from a gas conversion plant such that an associated gas stream can be heated prior to be separated by membrane unit utilizing polymer membranes such that the membrane unit can operate at relatively high temperature and flux and the $CO_2$ depleted product gas stream can be supplied to a gas conversion unit at a relatively high temperature.

DETAILED DESCRIPTION OF THE INVENTION

The present exemplary process and system (FPSO) synergistically combine several components together on the topsides of a FPSO to produce an unexpected improvement over the prior art. Produced fluids are processed which contain associated gases containing greater than 10% by volume of $CO_2$. In one embodiment, a majority of the $CO_2$ is removed using an advanced $CO_2$ removal membrane such a crosslinked polymeric membrane, which are described in several US patents and patent applications, as described below. The $CO_2$ is recovered at high purity, such as greater than 95% by volume. This highly enriched $CO_2$ stream is then compressed and preferably pumped to a dense phase fluid back beneath a hydrocarbon production zone. By reinjecting the dense-phase $CO_2$, as opposed to the entire associated gas as described above in the prior art, it becomes easier to recover more oil from the reservoir due to the favorable miscibility of $CO_2$ and oil.

The product gas stream, which is depleted of most of the $CO_2$ (e.g., containing ~8% $CO_2$ in one example), is sent to a gas conversion plant, including a syngas generation unit and a syngas conversion unit, located on the FPSO that uses hybrid catalysts. The hybrid catalysts assist in converting the product gas into three products: (1) a generally wax-free, synthetic crude oil which may be blended and stored in the hull of the FPSO along with produced crude oil, (2) a reaction water stream which may be treated and blended with the produced water stream for disposal, and (3) a flue gas stream resulting from the combustion of fuel. Significant fuel must be combusted to provide heat to the gas conversion plant. Waste heat from the gas conversion plant is supplied to a heat exchanger which adds heat to the associated gas; prior to the associated gas being separated into $CO_2$ enriched retentate stream and the $CO_2$ depleted product gas stream.

The present disclosure offers several improvements over prior systems. The membrane plants utilizing the crosslinked membranes, is operated at a higher temperature than normal membrane plants employing polymeric membranes. Accordingly, the product gas stream output from XLP membrane plant is introduced to a gas conversion plant at a relatively high temperature reducing the heat that must be provided to the gas conversion plant from other sources. The XLP membranes operate at relatively high to temperature, i.e. greater than 75° C., to increase the flux through the polymeric membranes thereby allowing smaller and lighter polymeric membranes to be used than are used with conventional membrane plants.

Figure 1:
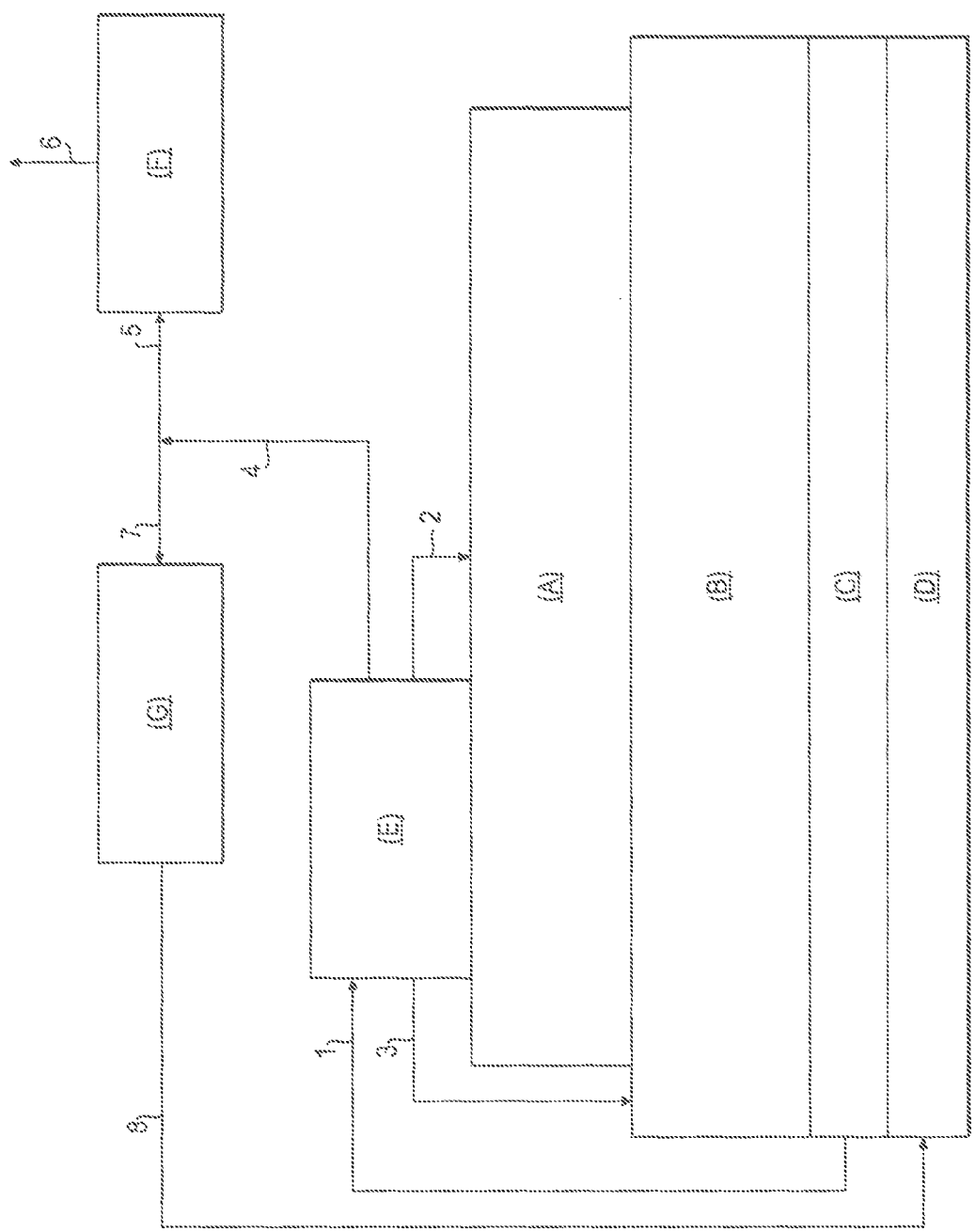
FIG. 1 is a schematic of a prior art system for producing produced well fluids from an offshore well onboard an FPSO wherein associated gases, including substantially light hydrocarbon gases and carbon dioxide, are either combusted and flared or else reinjected into a subterranean gas injection zone.
Figure 2:
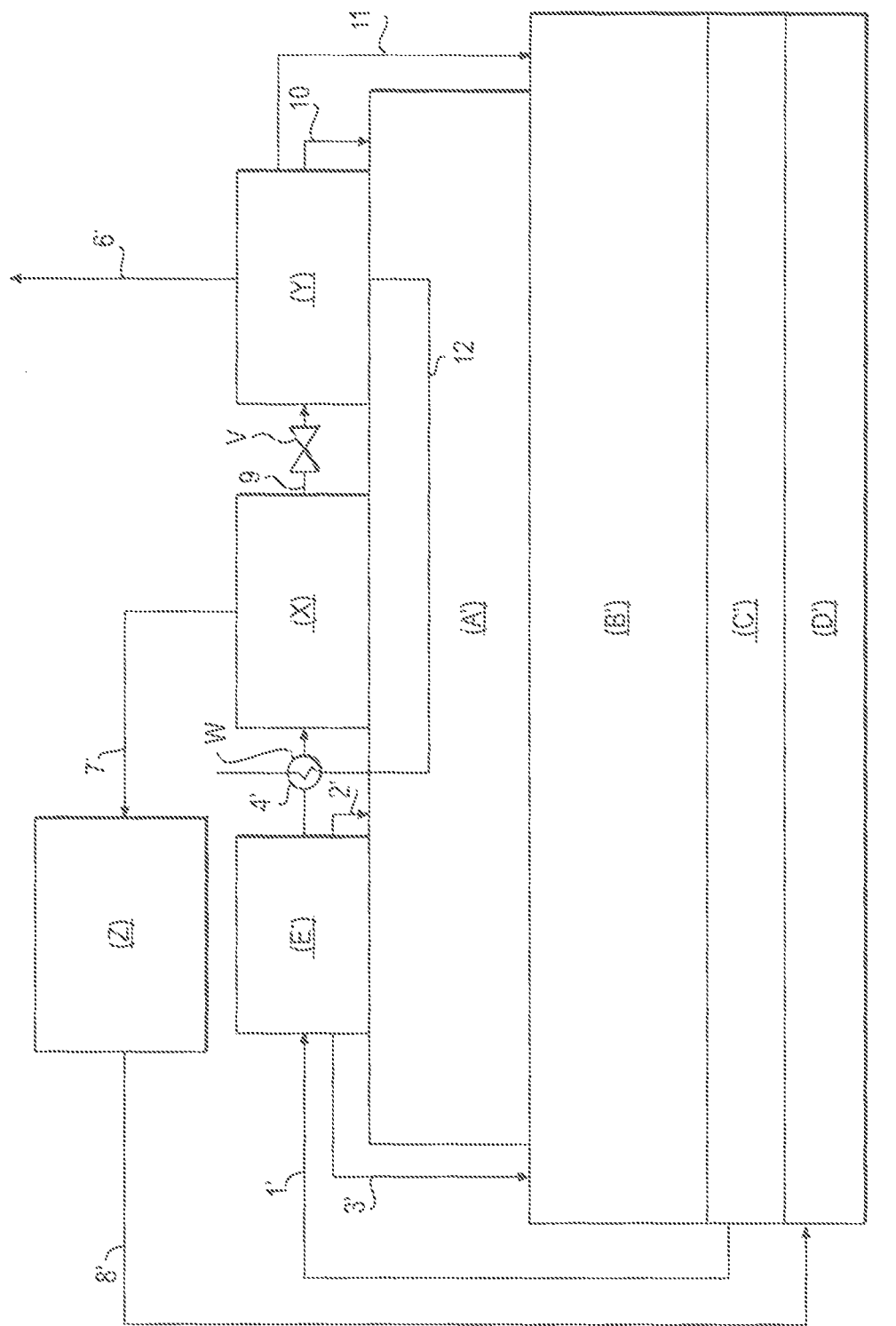
FIG. 2 is a schematic of an exemplary embodiment of a system for producing produced well fluids on board an FPSO wherein associated gases are separated, using an XLP (crosslinked polymer) membrane plant, into a hydrocarbon enriched retentate gas product stream and a $CO_2$ enriched permeate stream, the gas product stream being converted by a gas conversion plant into a waxless synthetic crude oil, reaction water and tail gas, with the synthetic crude oil being stored aboard the FPSO, the $CO_2$ enriched permeate stream being compressed and reinjected into a subterranean $CO_2$ injection zone, the reaction water being treated and disposed of overboard, and the tail gas being using as a fuel gas and/or as a recycle gas delivered to one or more of syngas production unit and syngas conversion reactor.

Referring now to FIG. 2, produced well fluids 1' from an underwater hydrocarbon production zone (C) is sent to the topsides of a FPSO (floating production, storage and offloading) vessel located in a body of water (B), such as an ocean or sea. The produced well fluids 1 are sent to a production separator or separator complex (E). Separation complex (E) is typically a group of equipment consisting of distillation towers, liquid-gas separators, pumps, and lines capable of separating the components in produced fluids into at least natural gas or associated gases, liquefied petroleum gas (LPG), and stabilized crude oil. The LPG is preferably further separated and further processed into saleable butane and propane. Other optional products such as condensate, produced water and sulfur compounds may also be separated by separation complex (E), as is well known in the art.

As non-limiting examples, separation complex (E) may include a gas-liquid separator which is a disengagement vessel or flash separator. Liquids are sent to an optional water-crude oil separator where water is separated from unstabilized crude oil. Bulk water separation from crude oil may be carried out using an apparatus for gravity separation or a centrifuge. Standard oil field equipment may be used, e.g., a gravity settling/residence time tank, a horizontal skimmer, a free-water knockout tank or drum, a vertical separator, a gun barrel, or a heater treater. These are available from manufacturers such as Smith Industries, Inc. (Houston, Tex.) and C.E. Natco, Inc. (Tulsa, Okla.). Suitable centrifuges are available from manufacturers such as Alpha Laval Sharples (Houston, Tex.). Gravity settling or centrifuging for bulk separation will yield a crude oil suitable for removal of residual water. As another example, the separation process described in U.S. Pat. No. 6,007,702 may be used.

Gases from a gas-liquid separator and gases from a stabilizer, which removes gases from crude oil may be distilled in a distiller with a heavy condensate portion being stored prior sent to a condensate tanker for transport. Alternatively, the LPG could be stored in a separate tank on the FPSO. Lighter portions of the gases are further distilled in a distiller into liquid petroleum gas (LPG) and an even lighter portion containing methane and ethane and propane gases and $CO_2$. This methane and ethane and $CO_2$ comprise associated gases 4'.

Associated gas 4' from separation unit (E) should be sufficiently treated such that the gases are suitable to be used with XLP plant (X) and will not damage any membranes. Alternatively, a pretreatment unit may be used with separation plant (X) to remove contaminants as well. For example, contaminants taken out by separation complex (E) include hydrogen sulfite and water. Generally the associated gas 4' output from separator complex (E) will include mostly natural gas ($C_1$-$C_3$) and $CO_2$.

Associated gas leaves the separators (E) and is sent to a heat exchanger (W). Waste heat is delivered by way of a fluid, such as water, to heat exchanger (W) which heats associated gas (4') so that the operation temperature of an XLP membrane plant (X) is greater than would otherwise occur without the heating of the associated gas. Preferably, the input temperature of the heated associated gas (4') is at least 80° C. in one embodiment. In another embodiment, the temperature of the associated gas is in the range of 80°-125° C. In yet another embodiment, this temperature is adjusted to operate in the range of 80°-150° C. If membrane modules are created using high temperature epoxies and seals which are designed to operate at 150° C. and above, the membrane separation may occur at 150° C. or even above 200° C.

Because these syngas generators operate at high temperatures, it is advantageous to utilize product gas, which is supplied to the syngas generators by the membrane plant (X), at as high of temperature as practical. Operating XLP membrane plant (X) at high temperatures helps increase the flux across the XLP membrane performing the separation of the associated gases. A small loss in selectivity may occur. However, overall the economics are in favor the increased flux that allows membranes having smaller gas contact areas to be used to process the same quantity of associated gases as compared to membrane operating at lower temperature, i.e. below 80° C.

Heated associated gases 4' are introduced to membrane plant (X'). Membrane plant (X') produces a high-purity $CO_2$ permeate stream (7') and a hydrocarbon-rich gas product stream (9'). The permeate (7') is compressed by compression plant (Z) ideally to a dense phase and then pumped and reinjected as a dense-phase fluid (8') into a $CO_2$ injection zone (D) that is located beneath the hydrocarbon production zone (C'). Injection of dense-phase $CO_2$ beneath the hydrocarbon production zone will help increase the recovery of oil over instances where associated gas with high $CO_2$ content may be injected as a high-pressure gas.

The $CO_2$ depleted gas product stream (9), containing primarily light hydrocarbon gases, is sent to a gas conversion plant (Y), which includes a synthesis gas generation unit and a gas conversion unit. An optional pressure reducer, such as valve (V), may be used to lower the pressure of the product stream (9) prior to it being converted from product gas to synthesis gas. The gas conversion unit ideally produces (1) a wax-free, synthetic crude oil which may be blended and stored in the hull of the FPSO along with the produced crude oil, (2) a reaction water stream which may be treated and blended with the produced water stream for disposal, and (3) a flue gas stream resulting from the combustion of fuel. The wax-free, synthetic crude oil (10), after being stabilized, is sent to the hull storage to be blended with stabilized crude oil. The reaction water (11) is treated and disposed of similar to the produced water (3'). The flue gas (6') from the combustion of heaters and any gas turbines maybe vented or otherwise appropriately disposed of.

Figure 3:
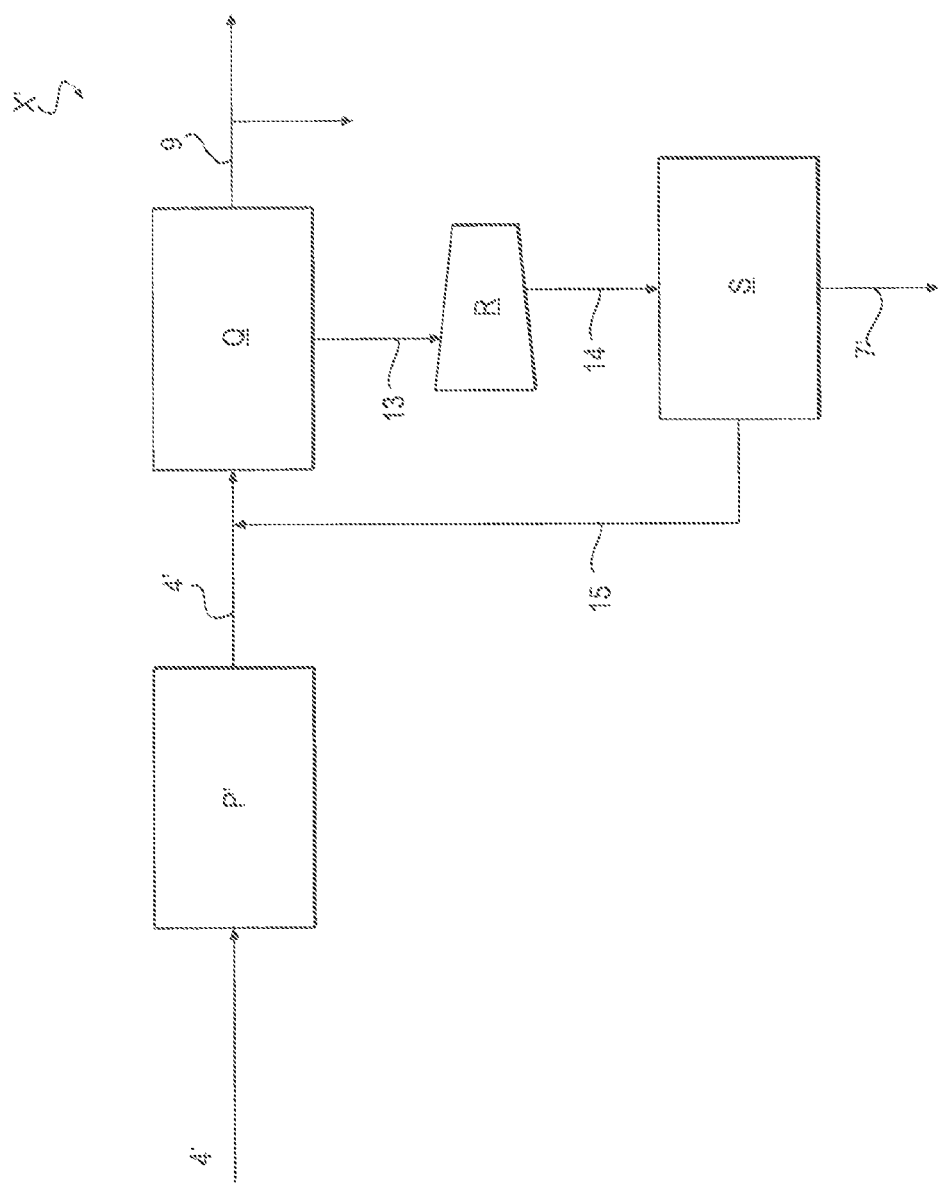
FIG. 3 is a schematic of an exemplary embodiment of the XLP membrane plant wherein associated gases are separated into a $CO_2$ enriched permeate stream of high purity (>95%) and a $CO_2$ depleted product gas stream which is to be delivered to the gas conversion plant.

FIG. 3 illustrates a plant flowsheet for the XLP membrane plant X. A two-stage design is chosen to maximize the recovery of hydrocarbon gas going to the gas conversion plant (Y) as well as maximizing the purity of the $CO_2$ enriched permeate in order to maximize the benefits of $CO_2$ injection for enhanced recovery. As will be appreciated by those skilled in the art, while two stages of XLP membranes are shown, one or more than two stages could also be used. Membrane units (Q) and (S) are preferably modules that use polymeric membranes, as described below in greater detail in Appendix A, part A. This description is excerpted from U.S. patent application Ser. No. 12/974,337, which has previously been incorporated by reference into the present patent application.

Heated associated gas 4' is introduced to XLP membrane plant (X'). Pretreatment of the associated gas may be performed to remove contaminants, if not already sufficiently treated by separation complex E'.

The temperature of associated gas input to the membrane plant (X) is at least 80° C., more preferably in the range of 80°-125° C. or in another embodiment, in the range of 80°-150° C. If provisions are made to construct a membrane unit or module which is specially adapted to high temperature, such as by using high temperature seals or epoxies, the operational temperature can be 150° C. or higher. The polymeric membranes are preferably glassy polymer and have glass transition (Tg) temperatures of at least 300° C.

A first XLP membrane module (Q) receives the heated associated gas producing a $CO_2$ depleted retentate gas stream which is output as the product gas 9 to be delivered to the gas conversion plant (Y). A permeate stream 13 is enriched in $CO_2$. A recycle compressor (R) is used to increase the pressure of the permeate stream to approximately 600 psia. A second stage XLP membrane (S) is then used to further separate the first permeate stream. The retentate stream 15 contains approximately 20% methane and 80% $CO_2$. The permeate stream 7' now contains $CO_2$ which ideally contains greater than 95% $CO_2$ by volume. The second retentate stream 15 combines with the associated gas feed stream 4' before being 4 is fed to the first stage membrane unit (Q).

Figure 4:
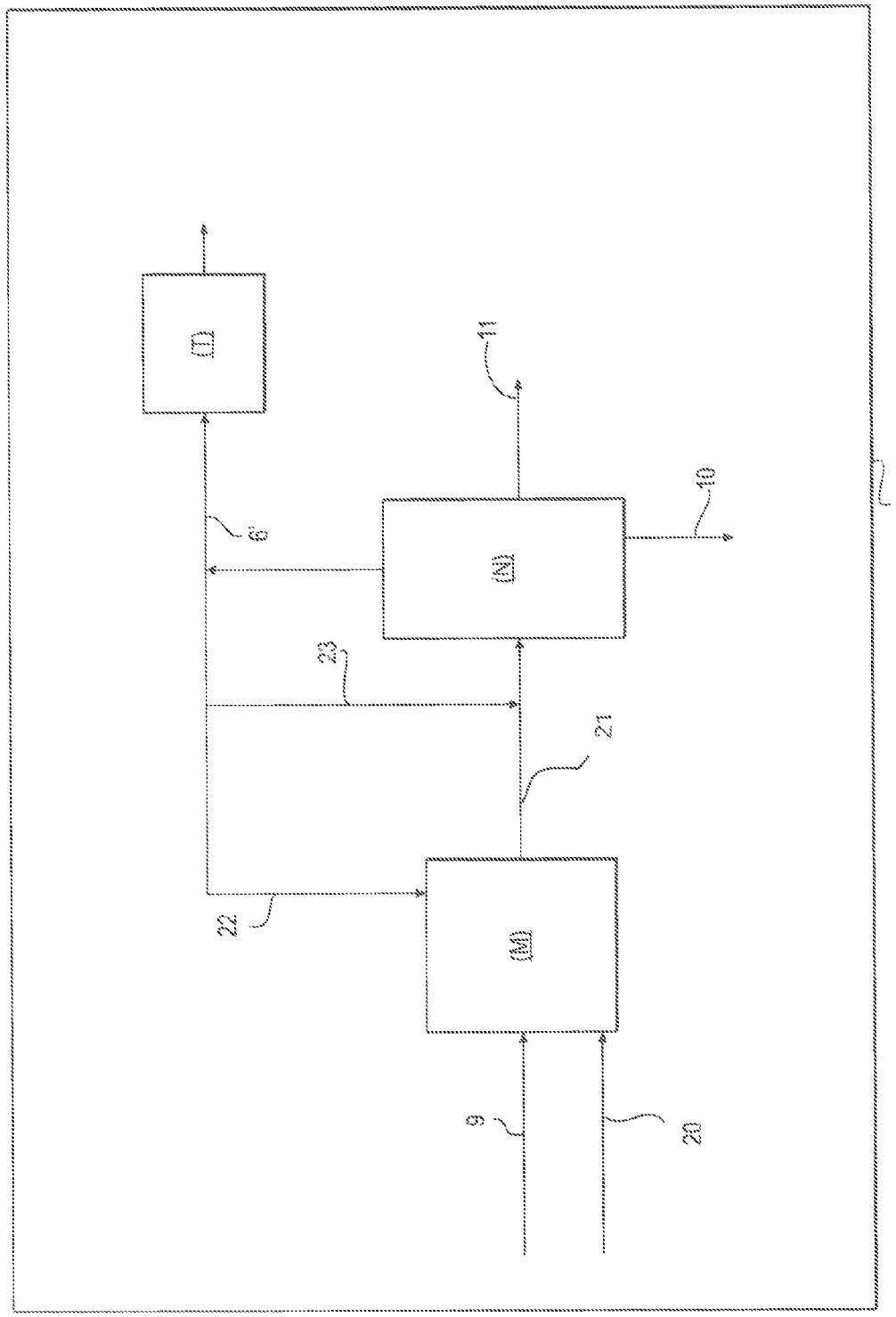
FIG. 4 is a schematic of the gas conversion plant wherein the product gas from the XLP membrane plant is first converted into a synthetic gas comprising CO and hydrogen gas $H_2$ (syngas) by a syngas unit with the syngas then being converted in a gas reactor utilizing a hybrid catalyst to produce a waxless synthetic crude, reaction water and tail gas with stabilized synthetic crude being stored by the FPSO along with stabilized regular crude oil.

A gas conversion plant flowsheet is shown in more detail in FIG. 4. The gas conversion plant (Y) includes a synthesis gas generator (M) and synthetic gas ("syngas") conversion unit (N) for producing effluent including a hydrocarbon wax free product, reaction water and tail gas. Appendix A, part B below lists patent applications that teach hybrid catalyst and systems that can be used to produce these preferred effluents including the generally wax free synthetic crude oil. According to one embodiment, the final liquid hydrocarbon product includes:
  i. 0 to 20 wt % $CH_4$; and
  ii. 0 to 5 wt % $C_{21+}$ normal paraffins.

Preferably, the final product further includes:
iii. 0 to 30 wt % $C_2$-$C_4$; and
iv. 50 to 95 wt % $C_{5+}$.

The liquid hydrocarbon product has a cloud point as determined by ASTM D 2500-09 of about 15° C. or less, even about 10° C. or less, even about 5° C. or less, and even as low as about 2° C. Cloud point refers to the temperature below which wax in a liquid hydrocarbon product forms a cloudy appearance as the wax forms an emulsion with the liquid phase of the product. Cloud point indicates the tendency of the product to plug pumps, filters or small orifices at cold operating temperatures. Note that a 6° C. cloud point is typical for a Number 2 diesel.

Alternatively, a hybrid FT catalyst can be run under certain FT reaction conditions to provide liquid hydrocarbon mixtures or products containing less than about 10 weight % $CH_4$ and less than about 5 weight % $C_{21+}$. The products formed can be substantially free of solid wax, i.e., $C_{21+}$ paraffins, by which is meant that there is minimal soluble solid wax phase at ambient conditions, i.e., 20° C. at 1 atmosphere. As a result, there is no need to separately treat a wax phase in hydrocarbons effluent from a reactor.

Although not as preferred, conventional Fischer-Tropsch reactors and processes could be used to produce synthetic crude as well. However, a hydrocracking unit may be required to produce a high percentage of liquid hydrocarbons and eliminate way ($C_{21}$+) products. Such a hydrocracking unit would add significant additional weight and occupy space on an offshore platform and is therefore not preferred.

The synthesis gas generator or methane reformer can use steam methane reforming (SMR) or autothermal reforming (ATR) to produce hydrogen and carbon monoxide from natural gas. Both methods work by exposing natural gas to a catalyst, usually nickel, at high temperature and pressure.

Conventionally steam methane reforming (SMR) uses an external source of hot gas to heat tubes in which a catalytic reaction takes place that converts steam and lighter hydrocarbons such as natural gas, in this case product gas from the XLP membrane plant, into hydrogen and carbon monoxide, which collectively, are referred to as synthetic gas or syngas.

Autothermal reforming (ATR) uses oxygen and carbon dioxide or steam in a reaction with methane to form synthetic gas. Methane or natural gas is partially oxidized in a chamber and is an exothermic reaction. When the ATR uses carbon dioxide the $H_2$:CO ratio produced is generally about 1:1; when the ATR uses steam the $H_2$:CO ratio produced is generally 2.5:1.

Using $CO_2$, the reaction include:

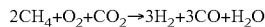

Using steam, the reaction is as follows:

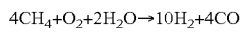

The outlet temperature of the syngas is generally between about 950°-1100° C. and outlet pressure can be as high as 100 bar.

While ATR uses oxygen, SMR does not. Oxygen to be supplied to an ATR can be produced by well know means such as using cryogenic oxygen separation or using ionic transport membranes. Conventional steam reforming plants operate at pressures between 200 and 600 psi with outlet temperatures in the range of 815° to 925° C. By way of example and not limitation, the oxygen may be supplied such as by way a cryogenic air separator or through the use on an ionic transport membrane.

Oxygen 20 and product gas 9 are input to syngas generator (M) and a syngas 21 is output. The oxygen may be supplied such as by way a cryogenic air separator or through the use of an ionic transport membrane. The syngas is converted in syngas conversion reactor (M) into an effluent stream which is then separated into three streams, (1) wax-free, synthetic crude oil 11 which may be blended and stored in the hull of the FPSO along with the produced crude oil, (2) a reaction water stream 10 which may be treated and blended with the produced water stream for disposal, and (3) a tail gas or recycle gas 6'. Some or all of recycle gas 6' can be used as a fuel gas for combustion as needed by gas conversion plant (Y). Alternatively, some or all of recycle gas 6' can be recycled back to syngas generator unit (M) by way of stream 22 and/or syngas conversion unit (N) by way stream 23.

While in the foregoing specification this invention has been described in relation to certain preferred embodiments thereof, and many details have been set forth for purpose of illustration, it will be apparent to those skilled in the art that the invention is susceptible to alteration and that certain other details described herein can vary considerably without departing from the basic principles of the invention. For example, the FPSO (A') could actually be two or more vessels or platforms. One vessel or ship or platform could contain a storage tank, for storing the combined synthetic crude oil and crude oil. Meanwhile, the processing equipment such as production separation (E'), Membrane Plant (X'), Gas Conversion Plant (Y') could be on one or more additional vessels or platforms. Again, membrane plants operating at high temperature i.e., >80° C., can be used to efficiently separate hydrocarbon gases from $CO_2$ using suitable membranes that can operate at 80° C. and above preferably, but not required, is that the membrane is a crosslinked polymer membrane.

Where permitted, all publications, patents and patent applications cited in this application are herein incorporated by reference in their entirety.

APPENDIX A

A. XLP Membrane Plant (X)—Excerpted from U.S. patent application Ser. No. 12/361,961.

U.S. patent application Ser. No. 12/361,961 is herein incorporated by reference in its entirety. Disclosed herein is a process for producing a $CO_2$ depleted product gas stream, comprising: feeding a associated gas feed stream comprising greater than about 10 vol % $CO_2$ to at least one membrane unit comprising a plurality of polymer membranes to provide a $CO_2$ enriched permeate comprising at least 95 vol % $CO_2$ and a $CO_2$ depleted product gas stream, the polymer membranes comprising a crosslinked polyimide polymer having covalent ester crosslinks and having a $CO_2$ permeance of at least 20 GPU and a $CO_2/CH_4$ selectivity of greater than 20, at 35° C. and a feed pressure of 100 psia.

Also disclosed herein is a process for producing a $CO_2$ depleted product gas stream, comprising: feeding a associated gas feed stream comprising greater than about 10 vol % $CO_2$ to at least one membrane unit comprising a plurality of polymer membranes to provide a $CO_2$ rich permeate comprising at least 95 vol % $CO_2$ and a $CO_2$ depleted product gas stream, the polymer membranes comprising a crosslinked polyimide polymer having covalent ester crosslinks and having a $CO_2$ permeance of at least 20 GPU and a $CO_2/CH_4$ selectivity of greater than 20, at 35° C. and a feed pressure of 100 psia; and feeding the $CO_2$ depleted product gas stream to a gas conversion plant.

Further disclosed herein is an apparatus for producing a $CO_2$ depleted product gas stream from a associated gas feed stream, the apparatus comprising: one or more membrane modules, each membrane module comprising one or more membrane elements and each membrane element comprising a plurality of polymer membranes formed into hollow fibers, the polymer membranes comprising a crosslinked polyimide polymer having covalent ester crosslinks and having a $CO_2$ permeance of at least 20 GPU and a $CO_2/CH_4$ selectivity of greater than 20, at 35° C. and a feed pressure of 100 psia, wherein the hollow fibers have a bore diameter greater than about 25 microns and a fiber length of less than about 15 feet.

"GPU" refers to Gas Permeation Unit, which is defined by the following formula:

GPU=[volume of gas passed by the membrane at standard temperature and pressure $(cm^3) \times 10^{-6}$]/[permeating area of the membrane $(cm^2) \times$ permeation time (s)×partial pressure differences across the membrane (cmHg)] Process for producing a $CO_2$ depleted product gas stream The process described herein removes $CO_2$ from a associated gas feed stream comprising a significant amount of carbon dioxide to provide a $CO_2$ depleted product gas stream and a $CO_2$ enriched permeate. The associated gas feed stream comprises greater than about 10 vol % $CO_2$ and the $CO_2$ enriched permeate comprises at least 95 vol % $CO_2$. The process provides the $CO_2$ depleted product gas stream and the $CO_2$ enriched permeate by feeding the associated gas feed stream to at least one membrane unit, which includes a plurality of polymer membranes comprising a particular crosslinked polyimide polymer having covalent ester crosslinks. The polymer membranes comprising the particular crosslinked polyimide polymer have a very high $CO_2$ permeance and a very high $CO_2/CH_4$ selectivity. In particular, the polymer membranes comprising the crosslinked polyimide polymer have a $CO_2$ permeance of at least 20 GPU and a $CO_2/CH_4$ selectivity of greater than 20, at 35° C. and a feed pressure of 100 psia.

In one embodiment, the $CO_2$ permeance can be at least 25 GPU and the $CO_2/CH_4$ selectivity can be greater than 25, at 35° C. and a feed pressure of 100 psia. In another embodiment, the $CO_2$ permeance can be at least 25 GPU and the $CO_2/CH_4$ selectivity can be greater than 30, at 35° C. and a feed pressure of 100 psia.

According to the process described herein, the at least one membrane unit is one or more membrane units. Each membrane unit comprises a plurality of polymer membranes comprising the crosslinked polyimide polymer.

Transport of gas molecules across the membranes can be described using a solution and diffusion mechanism, where the gas molecules dissolve at the upstream sides of the membranes, diffuse across the membranes, and exit on the downstream sides of the membranes. Thus, the polymer membranes do not work as filters with pores that separate small molecules from large molecules.

The productivity and efficiency of the membranes in enriching $CO_2$ over the other components of the associated gas feed stream (e.g. methane) can be described by the permeance and selectivity, respectively. Permeance is the pressure normalized flux across the membrane, where flux refers to the rate of movement of $CO_2$ molecules across a unit area of membrane. When the thickness of the dense separating layer is known, the flux can be expressed as a quantity called permeability (P), which is a pressure- and thickness-normalized flux. Selectivity can be defined as the ratio of the permeabilities or permeances of the gas components across the membrane (i.e., $P_A/P_B$ where A and B are the two components). Thus, the efficiency of the membrane in enriching $CO_2$ over $CH_4$ is $P_{CO2}/P_{CH4}$ or $CO_2/CH_4$ selectivity.

$CO_2$ permeability and $CO_2$ selectivity are properties of the membrane material itself, and thus the properties are ideally constant with feed pressure, flow rate and other process conditions. However, $CO_2$ permeability and $CO_2$ selectivity are both temperature-dependent. Permeance is a membrane property and is also dependent on the separation (dense) layer thickness and the permeability of the membrane material.

The removal of $CO_2$ from the associated gas feed stream is achieved by a membrane that permits a faster permeation rate for $CO_2$ (i.e., higher permeance) over the other components of the associated gas feed stream. Accordingly, the polymer membranes comprising the crosslinked polyimide polymer separate $CO_2$ because $CO_2$ dissolves into and diffuses through the crosslinked polyimide polymer at a faster rate than certain other molecules in the associated gas feed stream (e.g. methane).

For $CO_2$ removal, the membrane material should have both a high $CO_2$ permeance and a high $CO_2/CH_4$ selectivity. With higher $CO_2$ permeance, less membrane area is required. With higher $CO_2/CH_4$ selectivity, more $CO_2$ than $CH_4$ arrives in the permeate.

Accordingly, the very high $CO_2$ permeance and the very high $CO_2/CH_4$ selectivity of the crosslinked polyimide polymer membranes are particularly useful in the presently claimed process for producing a $CO_2$ depleted product gas stream.

The $CO_2$ permeance of at least 20 GPU reduces the number of membranes necessary for $CO_2$ separation. As such, the $CO_2$ permeance of at least 20 GPU reduces the weight and footprint of the membranes and their ancillary equipment (e.g. piping, valves, casing, manifolds, etc.). For example, if the crosslinked polyimide polymer membranes are used to retrofit an offshore platform, weight and space allocated to the membranes on the platform will be reduced, which means that additional weight and space may be allocated to other unit operations (e.g. an extra feed gas compressor to boost production, additional utility systems, etc.). As another example, if an offshore platform is designed for new construction, the entire platform (including the topsides and the supporting structure) may be designed to be smaller and less expensive, with plenty of space allocated to other unit operations.

The $CO_2/CH_4$ selectivity of greater than 20 reduces the amount of slipped methane in the $CO_2$ enriched permeate stream. As such, the $CO_2/CH_4$ selectivity can provide a permeate stream sufficiently pure in $CO_2$, which may be vented with lower GHG emissions, reinjected, or sequestered. With conventional polymer membranes, such as cellulose acetate membranes, it has not been possible to provide a permeate stream with such $CO_2$ purity when treating a associated gas feed stream having a relatively high $CO_2$ content. In particular, the present inventors have discovered that the crosslinked polyimide polymer membranes can provide a permeate stream comprising at least 95 vol % $CO_2$, which may be vented with lower GHG emissions, reinjected, or sequestered. By providing such a pure $CO_2$ enriched permeate stream, the $CO_2$ depleted product stream contains much more of the methane than is possible with other membranes.

The $CO_2/CH_4$ selectivity of greater than 20 also increases the profitability of the $CO_2$ separation process. Reducing the amount of slipped methane reduces the amount of methane diverted from the product gas stream. Since methane is desired in the product gas stream (e.g. for heating value), the product gas stream can be sold at a higher price.

Associated Gas Feed Stream

The $CO_2$ content of the associated gas feed stream may vary. In one embodiment, the associated gas feed stream comprises greater than about 10 vol % $CO_2$. In another embodiment, the associated gas feed stream comprises greater than about 15 vol % $CO_2$. For example, the associated gas feed stream may include between about 15 vol % and about 80 vol % $CO_2$. As another example, the associated gas feed stream may include between about 15 vol % and about 70 vol % $CO_2$. In another embodiment, the associated gas feed stream comprises greater than about 20 vol % $CO_2$. For example, the associated gas feed stream may include between about 25 vol % and about 40 vol % $CO_2$.

The feed rate of the associated gas feed stream may be adapted to accommodate particular process circumstances and requirements (e.g. the flow rate of the natural gas stream from a particular deposit, the required flow rate of the $CO_2$ depleted product gas stream, etc.). According to one embodiment, the associated gas feed stream is fed to the at least one membrane unit at a flow rate of between about 10 million scf/day and about 1 billion scf/day. According to another embodiment, the associated gas feed stream is fed to the at least one membrane unit at a flow rate of between about 200 million scf/day and about 1 billion scf/day. According to yet another embodiment, the associated gas feed stream is fed to the at least one membrane unit at a flow rate of between about 200 million scf/day and about 800 million scf/day.

$CO_2$ Depleted Product Gas Stream

The $CO_2$ content of the $CO_2$ depleted product gas stream may also vary depending upon process requirements. In one embodiment, the $CO_2$ depleted product gas stream comprises between about 50 ppmv $CO_2$ and about 23 vol % $CO_2$. In another embodiment, the $CO_2$ depleted product gas stream comprises between about 1 vol % $CO_2$ and about 23 vol % $CO_2$. In yet another embodiment, the $CO_2$ depleted product gas stream comprises between about 8 vol % $CO_2$ and about 23 vol % $CO_2$.

Preparation of Polymer Membranes Comprising Crosslinked Polyimide Polymer

U.S. Pat. Nos. 6,932,859 and 7,247,191 discuss the preparation of polymer membranes comprising the crosslinked polyimide polymer. U.S. Pat. No. 6,932,859 is directed to a hollow fiber polymer membrane comprising the crosslinked polyimide polymer. U.S. Pat. No. 7,247,191 is directed to a composite polymer membrane comprising the crosslinked polyimide polymer. These patents are herein incorporated by reference in their entirety.

U.S. patent application Ser. Nos. 12/007,466 and 12/007,467 improve upon the preparation process by reducing or eliminating molecular weight loss during the monoesterification reaction of the preparation process. Specifically, utilizing dehydrating conditions during the monoesterification reaction reduces or eliminates molecular weight loss. These patent applications are also herein incorporated by reference in their entirety.

Making the polymer membranes comprising the crosslinked polyimide polymer first involves a polymerization reaction and an imidization reaction. The polymerization and imidization reaction form a polyimide polymer. Making the polymer membranes comprising the crosslinked polyimide polymer next involves a monoesterification reaction to form a monoesterified polyimide polymer. The monoesterified polyimide polymer is then formed into hollow fibers or cast to form flat sheets. Subsequently, the monoesterified polyimide polymer is subjected to a transesterification reaction to form crosslinked polyimide polymer.

Polymerization and Imidization Reactions

The polymerization reaction prepares a polyimide polymer comprising carboxylic acid functional groups. The polymerization reaction involves combining monomers and at least one solvent such that the monomers dissolve in the solvent to form a reaction solution. Thereafter, the monomers polymerize through the formation of amide bonds to provide a polyamide polymer.

The imidization reaction prepares a polyimide polymer comprising carboxylic acid functional groups. During the imidization reaction, the amide bonds of the polyamide polymer are converted to imide rings.

With regard to the polymerization reaction, it is important that at least some of the monomers include carboxylic acid functional groups such that the resultant polyimide polymer comprises carboxylic acid functional groups. The monomers can include dianhydrides, tetracarboxylic acids, and furandiones. The monomers can further include diamino compounds such as diamino cyclic compounds and diamino aromatics. Such diamino aromatics can have more than one aromatic ring where the amino groups are on the same or different aromatic ring.

For example, the monomers can include monomers A, B, and C wherein A is a dianhydride of the formula:

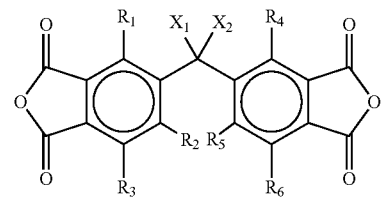

$X_1$ and $X_2$ are the same or different halogenated alkyl, phenyl or halogen;
$R_1$, $R_2$, $R_3$, $R_4$, $R_5$, and $R_6$ are H, alkyl, or halogen;
B is a diamino cyclic compound without a carboxylic acid functionality; and
C is a diamino cyclic compound with a carboxylic acid functionality.

If the monomers are comprised of the monomers A, B, and C, the ratio of B to C can be between 1:4 and 8:1. Alternatively, the ratio of B to C can be between 17:3 and 3:2. As another alternative, the ratio of B to C can be between 17:3 and 3:1. As yet another alternative, the ratio of B to C can be between 4:1 and 3:2.

The monomer A can be 4,4'-(hexafluoroisopropylidene) diphthalic anhydride (6FDA), which is also known as (2,2-bis(3,4-dicarboxylphenyl) hexafluoropropane. 6FDA has the following formula:

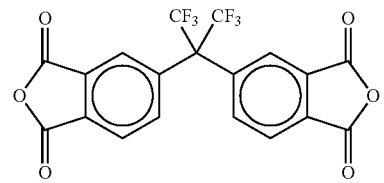

Including 6FDA in the monomers provides stability to the polyimide polymer because 6FDA has limited rotational ability.

Monomers with limited rotational ability, like 6FDA, are desirable because they increase the selectivity of the membrane. Monomers with bulky side groups, like $(CF_3)_2$ in 6FDA, also inhibit chain packing, which increases permeability of molecules through the membrane. As discussed above, both selectivity and permeability are important for efficient and productive separations. Further reference to these structure property relationships can be found in Koros and Fleming, *Journal of Membrane Science*, 83, 1-80 (1993), herein incorporated by reference in its entirety.

DABA and about 60 percent DAM. When 6FDA, DAM, and DABA are present in these stoichiometric concentrations, the resulting polyimide polymer is represented by the formula:

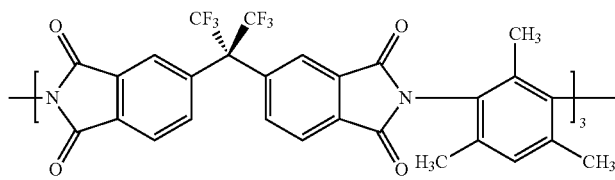
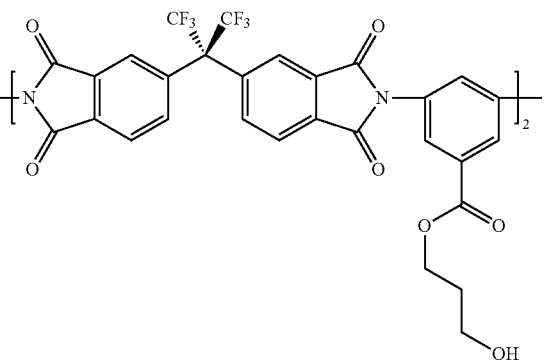

The monomer B, a diamino cyclic compound without a carboxylic acid functionality, can be a diamino aromatic compound with more than one aromatic ring where the amino groups are on the same or different aromatic ring. For example, the monomer B can be 4,4' isopropylidene dianiline, 3,3' hexafluoroisopropylidene dianiline, 4,4' hexafluoroisopropyliene dianiline, 4,4' oxydianiline, 3,3' oxydianiline, 4,4' diaminodiphenyl, diaminotoluene, diaminobenzotrifluoride, dimethyldiaminobenzene, trimethyldiaminobenzene, or tetramethyldiaminobenzene. The monomer B can also be 2,4,6-trimethyl-m-phenylenediamine (DAM), which is represented by the following formula:

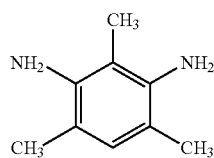

The monomer C, a diamino cyclic compound with a carboxylic acid functionality, can be diamino benzoic acid. It is represented by the following formula:

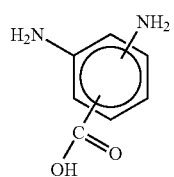

More specifically, the monomer C can be 3,5 diaminobenzoic acid (DABA).

In one embodiment, the monomers include A, B, and C where A is 6FDA, B is DAM, and C is DABA. In this embodiment, the 6FDA content of the monomer mixture is about 50 percent and the remaining about 50 percent of the monomer mixture is composed of DAM and DABA. The DABA content is between about 20 percent and about 100 percent of the remaining about 50 weight percent. For example, the 6FDA content of the monomer mixture can be about 50 percent and the remaining about 50 percent can be about 40 percent DABA and about 60 percent DAM. When 6FDA, DAM, and DABA are present in these stoichiometric concentrations, the resulting polyimide polymer is represented by the formula:

In another embodiment, the monomers include A, B, and C, where A is 6FDA, B is DAM, and C is DABA as well as one or more additional dianhydrides.

Regardless of the monomers used, they can be purified by techniques known in the art, for example, sublimation or recrystallization.

The monomers are dissolved in at least one solvent to create a reaction solution and facilitate polymerization. The at least one solvent can comprise between about 75 and about 95 weight percent of the reaction solution. The at least one solvent can be at least one high boiling organic solvent. The solvent can also be mixtures of organic solvents. Exemplary high boiling organic solvents are listed in Table 1 along with their normal boiling points.

TABLE 1

| High boiling organic solvent | Normal boiling point (° C.) |
| --- | --- |
| N-Methyl-2-pyrrolidione (NMP) | 202.1 |
| Dimethyl sulfoxide (DMSO) | 190 |
| Dimethylformamide (DMF) | 152.9 |
| Dimethylacetamide (DMAc) | 165.1 |
| Diglyme | 162 |

Accordingly, the solvent of the reaction solution can be any one of the organic solvents listed above or mixtures thereof. High boiling solvents are desirable because they prevent excessive evaporation, which would significantly alter concentrations in the reaction solution and concentrations during subsequent processing.

Polymerization can occur at room temperature while the reaction solution is stirred or otherwise agitated. Solvent concentration during polymerization can be between about 75 and about 95 weight percent of the reaction solution. The monomers can comprise between about 15 and about 25 weight percent of the reaction solution.

The resulting polyamide polymer remains in the reaction solution for imidization. In the imidization reaction, the amide bonds of the polyamide polymer form imide rings to provide the polyimide polymer. The imidization reaction occurs over an extended period of time, approximately 12-36 hours. Such an extended period of time ensures that the imidization reaction proceeds to completion, which is important with respect to yield of the polyimide polymer. The imidization reaction can occur at temperatures between about 160° C. and about 200° C. Solvent concentration during imidization can be between about 75 and about 95 weight percent of the reaction solution.

The imidization reaction can take place under dehydrating conditions. Water is produced as a by-product during the imidization reaction. Such dehydrating conditions at least partially remove this water by-product from the reaction solution. It is desirable to remove water produced during the imidization reaction because it can degrade the imide rings of the polyimide polymer during the subsequent monoesterification reaction. This residual imidization water can also cause chain scissioning of the polyimide polymer. While the polyimide polymer could be precipitated out of the reaction solution as in conventional processes and then subjected to monoesterification, including dehydrating conditions during the imidization reaction makes such a precipitation step unnecessary and the entire reaction can be a "one-pot" synthesis.

If dehydrating conditions are utilized during the imidization reaction to remove water, the concentration of water in the reaction solution can be maintained at between about 0 weight percent and about 0.26 weight percent.

The dehydrating conditions can be the presence of a chemical dehydrating agent and/or a mechanical dehydrating agent. The dehydrating conditions can be the presence of a chemical dehydrating agent only, a mechanical dehydrating agent only, or the combination of a chemical dehydrating agent and a mechanical dehydrating agent.

If a chemical dehydrating agent is utilized, the chemical dehydrating agent does not impede the imidization reaction. For example, it does not decrease the imidization reaction rate or decrease the monoesterified, polyimide polymer yield. The chemical dehydrating agent can form an azeotrope with water, which can be boiled out of the reaction solution. Such azeotropic chemical dehydrating agents are well known to one of ordinary skill in the art. Exemplary azeotropic chemical dehydrating agents include ortho-dichlorobenzene (ODCB), benzene, toluene, and mixtures thereof. Alternatively, the chemical dehydrating agent can be a carbodiimide.

If an azeotropic chemical dehydrating agent is used as the chemical dehydrating agent, it can be used in relatively large amounts, for example, between about 1 ml and about 4 ml per gram of the polyamide polymer. Such a large amount of azeotropic chemical dehydrating agent ensures that the water produced by the imidization reaction is removed from the reaction solution.

If a carbodiimide is used as the chemical dehydrating agent, it can be used in an amount between about 1 and about 4 times the stoichiometric amount based on moles of water removed.

The chemical dehydrating agent can also be periodically added to the reaction solution. For example, ODCB can be added periodically. According to one embodiment, the chemical dehydrating agent is added to the reaction solution in three separate batches.

If a mechanical dehydrating agent is utilized, the mechanical dehydrating agent is a physical system designed to remove water. An exemplary mechanical dehydrating agent is a Dean-Stark trap. Dean-Stark traps are well known to those of ordinary skill in the art. Any mechanical system that prevents water distilled from the reaction solution from returning to the reaction solution is suitable.

Monoesterification Reaction

The monoesterification reaction involves treating the polyimide polymer with a diol at esterification conditions in the presence of dehydrating conditions to form a monoesterified polyimide polymer. After the imidization reaction is complete, the reaction solution comprises the polyimide polymer, the at least one solvent, and any unreacted monomers. The diol can be directed added to the reaction solution as a crosslinking agent to form a monoesterification reaction solution. Thus, both the imidization reaction and the monoesterification reaction can take place in one reaction vessel or "one pot." Alternatively, the polyimide polymer can be isolated and then combined with the diol to form a monoesterification reaction solution such that the imidization reaction and the monoesterification reaction take place in separate reaction vessels.

The monoesterification reaction involves the following reaction scheme:

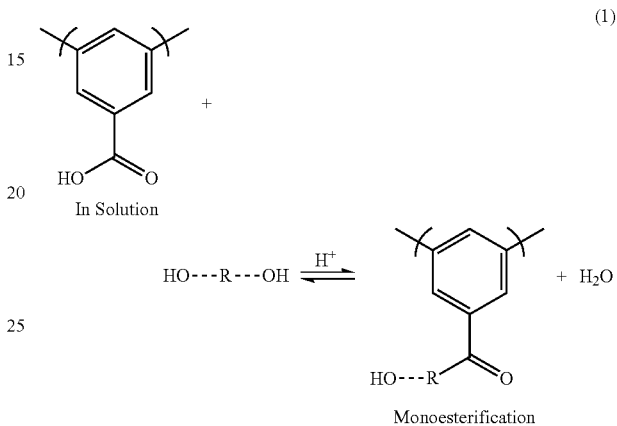

(1)

Monoesterification

During monoesterification, one of the —OH groups in the diol molecules reacting with the —COOH groups of the polyimide polymer to convert the —COOH groups to esters and provide the monoesterified polyimide polymer. Water is also produced as a by-product during monoesterification. Importantly, at least a portion of the water is removed from the monoesterification reaction solution by the dehydrating conditions.

The length of the diol is an important consideration. If the diol is too long or too short, it can decrease the permeability and/or selectivity of a membrane formed from the monoesterified, polyimide polymer.

Useful diols include ethylene glycol, propylene glycol, 1,3 propanediol, 1,4 butanediol, 1,2 butanediol, benzenedimethanol, 1,3 butanediol, and mixtures thereof. In one embodiment, the diol is selected from the group consisting of ethylene glycol, propylene glycol, 1,3 propanediol, benzenedimethanol, and mixtures thereof. In another embodiment, the diol is selected from the group consisting of ethylene glycol, propylene glycol, 1,3, propanediol, and mixtures thereof. In yet another embodiment, the diol is selected from the group consisting of ethylene glycol, 1,3, propanediol, and mixtures thereof. In still another embodiment, the diol is 1,3 propanediol.

As with the optional dehydrating conditions of the imidization reaction, the dehydrating conditions of the monoesterification reaction can result from a chemical dehydrating agent and/or a mechanical dehydrating agent. Therefore, the dehydrating conditions can be a chemical dehydrating agent alone, a mechanical dehydrating agent alone, or the combination of a chemical dehydrating agent and a mechanical dehydrating agent. It is desirable that the dehydrating conditions, whether chemical or mechanical, remove water produced during the monoesterification reaction from the monoesterification reaction solution such that the concentration of water in the monoesterification reaction solution is maintained at between about 0 weight percent and about 0.08 weight percent.

If a chemical dehydrating agent is utilized, the chemical dehydrating agent does not impede the monoesterification reaction. For example, it does not decrease the monoesterification reaction rate or decrease the monoesterified, polyimide polymer yield. The chemical dehydrating agent can be an azeotropic chemical dehydrating agent or can be a carbodiimide. An azeotropic chemical dehydrating agent forms an azeotrope with the water by-product, which can be boiled out of the monoesterification reaction solution. Such azeotropic chemical dehydrating agents are well known to those of ordinary skill in the art and include ODCB, benzene, toluene, and mixtures thereof.

A carbodiimide functions as a chemical dehydrating agent by participating in the monoesterification reaction by activating the carboxylic acid functionality of the polyimide polymer toward ester formation and thereby eliminating the water by-product at the same time. This carbodiimide dehydration reaction mechanism is depicted below.

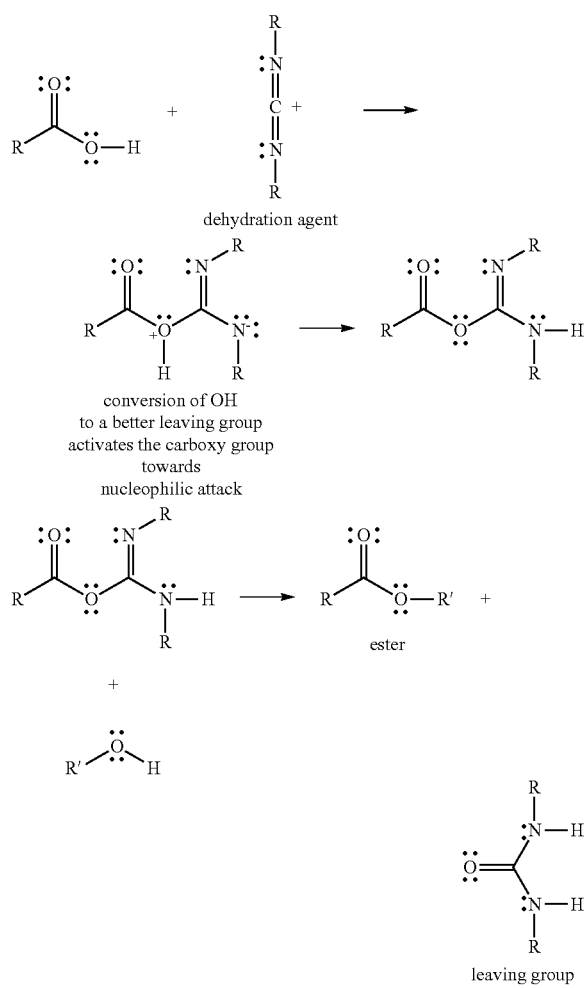

If an azeotropic chemical dehydrating agent is used as the chemical dehydrating agent, it can be used in relatively large amounts, for example, between about 1 ml and about 4 ml per gram polyimide polymer. Such a large amount of azeotropic chemical dehydrating agent ensures that the water produced by the monoesterification reaction is removed from the monoesterification reaction solution.

If a carbodiimide is used as the chemical dehydrating agent, it can be used in an amount between about 1 and about 4 times the stoichiometric amount based on the moles of water removed.

The chemical dehydrating agent can also be periodically added to the monoesterification reaction solution throughout the monoesterification reaction. For example, ODCB can be added periodically. According to one embodiment, the chemical dehydrating agent is added to the monoesterification reaction solution in three separate batches.

As in the imidization reaction, the mechanical dehydrating agent is a physical system designed to remove water. An exemplary mechanical dehydrating agent is a Dean-Stark trap. Dean-Stark traps are well known to those of ordinary skill in the art. Any mechanical system that prevents water distilled from the monoesterification reaction solution from returning to the monoesterification reaction solution is suitable.

If dehydrating conditions are utilized during the imidization reaction, the dehydrating conditions of the monoesterification reaction can be the same as the dehydrating conditions of the imidization reaction. In fact, it is desirable for the dehydrating conditions to be the same because this simplifies the overall synthesis. In conventional polymerization/imidization/monoesterification reaction methods, the polyimide polymer is precipitated out of the reaction solution. However, this extra precipitation step is eliminated when the same dehydrating conditions are utilized during monoesterification. Further, dehydrating conditions remaining from the imidization reaction can be employed in the monoesterification reaction.

Along with the diol, an acid catalyst can also be added to the reaction solution to facilitate the monoesterification reaction.

Acid catalysts useful in monoesterification reactions are well known to those of skill in the art. Acid catalysts activate the carboxyl functional groups of the polyimide polymer so that they will react with the hydroxyl groups of the diol. Acid catalysts replace acid chlorides as carboxyl functional group activators. The use of acid chlorides as carboxyl functional group activators is set forth in Example 1 of U.S. Pat. No. 6,755,900, which document is incorporated by reference in its entirety herein. Exemplary acid catalysts include para-toluene sulfonic acid, sulfuric acid, methanesulfonic acid, triflic acid, and mixtures thereof. If the dehydrating conditions utilized include a carbodiimide, acid catalyst may not be necessary because the carboxyl functional group of the polyimide polymer is activated by the carbodiimide.

The amount of acid catalyst present during the monoesterification reaction, under dehydrating conditions, also affects the average molecular weight of the monoesterified, polyimide polymer. More particularly, when the amount of acid catalyst used is less than the conventional amount and dehydrating conditions are present, significantly less molecular weight loss, no molecular weight loss, or even molecular weight gain, occurs. While not wishing to be bound by any particular theory, it is believed that excess acid catalyst augments degradation of the imide rings of the polyimide polymer, which causes undesirable chain scissioning and loss of average molecular weight. If DABA monomers are used, the amount of acid catalyst can be further reduced from the conventional amount. This is due to the fact that DABA monomers are intrinsically acidic.

Between about 0 milligrams and about 0.25 milligrams of acid catalyst can be added to the monoesterification reaction solution per gram of polyimide polymer without experiencing undesirable molecular weight loss.

In the monoesterification reaction, the monoesterification reaction solution, with or without catalyst, is heated to a relatively high temperature over an extended period of time. Generally, the monoesterification reaction solution is heated for approximately 12-30 hours at a temperature between about 120° C. and about 140° C.

In small (volume) scale reactions, the dehydrating conditions can remove water more easily than in large (volume) scale reactions because the surface area to volume ratio of the reaction vessel is higher. Such a higher ratio facilitates boiling of the water.

If large (volume) scale reactions, it is advantageous for both the imidization reaction and the monoesterification reaction to occur in the same reaction vessel. Then any dehydrating conditions remaining from the imidization reaction can be easily utilized during the monoesterification reaction.

Forming Monoesterified Polyimide Polymer Membranes

The forming step can involve forming the monoesterified polyimide polymer into membranes.

The membranes can be in the form of hollow fibers or flat sheets. Methods of spinning hollow fibers and casting flat sheets are well known in the art. Exemplary spinning methods include wet-quench/dry-jet spinning and wet spinning. A useful wet-quench/dry-jet spinning process is disclosed in U.S. patent application Ser. No. 12/007,467, which is incorporated in its entirety herein.

The membranes made from the high molecular weight, monoesterified polyimide polymer may take any form known in the art, for example, hollow fibers, tubular shapes, and other membrane shapes. Other membrane shapes include spiral wound membranes, pleated membranes, flat sheet membranes, and polygonal membranes. The high molecular weight, monoesterified polyimide polymer as disclosed herein can also be cast to form sheets or films. The sheets or films can be self-supporting or be cast onto a suitable support to provide a composite sheet. The sheets and films can be cast onto a sheet of another polymer. This polymer support can be a porous and low cost polymer. As such, this porous polymer can be used as a support for a less porous sheet or film formed from the high molecular weight, monoesterified polyimide polymer as disclosed herein.

Transesterification Reaction

To crosslink the monoesterified polyimide polymer in the membranes, the monoesterified polyimide polymer is subjected to a transesterification reaction. The transesterification reaction involves subjecting the monoesterified polyimide membrane to transesterification conditions to form a crosslinked membrane.

The transesterification reaction involves the following reaction scheme:

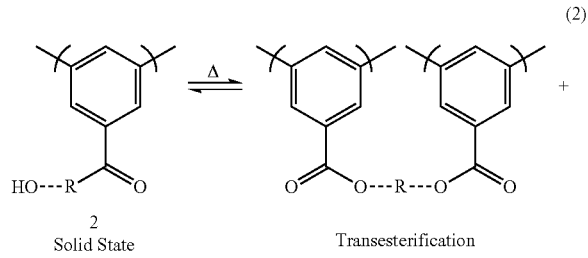

(2)

During transesterification, the —OH groups in esters in one monoesterified polyimide polymer chain react with esters in another monoesterified polyimide polymer chain to form a transester or crosslink. Any unconverted —COOH groups in one monoesterified polyimide polymer chain can also react with —OH groups in esters in another monoesterified polyimide polymer chain to form a crosslink. In this manner, the transesterification reaction crosslinks the monoesterified polyimide polymer chains. The crosslinked polyimide polymer can have a ratio of crosslinkable sites to imide groups of between 3:8 and 1:16.

Typical transesterification conditions are known in the art. Generally, transesterification can be accomplished by heating the monoesterified polyimide membrane. Heating initiates the transesterification reaction and, additionally, removes residual solvent.

The monoesterified, polyimide membrane can be heated to crosslink at a temperature of about 150° C. or higher under vacuum. In one embodiment, the monoesterified, polyimide membrane is heated to crosslink at a temperature of about 180° C. or higher under vacuum. In another embodiment, the monoesterified, polyimide membrane is heated to crosslink at a temperature of about 200° C. or higher under vacuum. For example, the monoesterified polyimide membrane can be heated under vacuum at 200° C. for approximately 2 hours and cooled under vacuum for approximately 6 hours. Higher temperatures generally result in a greater degree of crosslinking.

Transesterification can also be accomplished by UV or microwave treatment. Furthermore, transesterification reactions can be catalyzed. Transesterification catalysts can be the same acid catalysts used during monoesterification, which include para-toluene sulfonic acid, sulfuric acid, methanesulfonic acid, triflic acid, and mixtures thereof.

The at Least One Membrane Unit

As described above, the at least one membrane unit includes a plurality of polymer membranes. The plurality of polymer membranes can be manufactured into one or more membrane elements. As discussed above, the polymer membranes comprising the crosslinked polyimide polymer may be in the form of hollow fibers or flat sheets. Accordingly, exemplary membrane elements are hollow fiber membrane elements, which are manufactured from hollow fibers, and spiral wound membrane elements, which are manufactured from flat sheets. Another exemplary membrane element is a flat stack permeator.

Once the polymer membranes are formed into membrane elements, the membrane elements are typically assembled into modules. For example, multiple hollow fiber membrane elements may be joined together and inserted into a pressure vessel, typically but not restricted to a cylindrical tube. This pressure vessel with its interior membrane elements is a membrane module. In a case where the feed is introduced bore side and the permeate is collected at relatively low pressures, the pressure vessel does not need to withstand high pressures and can be made of a light material. Examples of such materials and membrane geometries are discussed in Koros and Fleming, *Journal of Membrane Science*, 83, 1-80, (1993), herein incorporated by reference in its entirety. Since pressure vessels are generally heavy, a low pressure shell design can be beneficial when weight reduction is a priority and the fibers are strong enough to withstand the feed pressure without bursting.

Multiple membrane modules are generally mounted on skids. The membrane modules may be mounted horizontally or vertically. For example, multiple pressure vessels each housing multiple hollow fiber membrane elements may be mounted horizontally onto a skid.

Membrane Elements

Hollow Fiber Membrane Element

As discussed above, a hollow fiber membrane element is manufactured from polymer membranes formed into hollow fibers.

A hollow fiber membrane element can include hollow fibers wrapped around a perforated central tube with both ends of the fibers open to a permeate pot. In use, the natural gas feed stream can flow over and between the fibers. $CO_2$ permeates into the hollow fibers and travels along the bores of the hollow fibers to the permeate pot. The $CO_2$ can then exit the permeate pot through a permeate pipe. Components in the natural gas feed stream that do not permeate into the hollow fibers eventually reach the perforated central tube, which collects these non-permeating components.

A hollow fiber membrane element can also include hollow fibers in bundled arrays potted at either end to form tube sheets and fitted into a pressure vessel thereby isolating the insides of the fibers (bore/tube-side) from the outsides of the fibers (shell-side). The fibers are held together by any conventional means. Typically one end of the fiber bundle extends to one end of the pressure shell and the opposite end of the fiber bundle extends to the opposite end of the pressure shell. The fiber bundle is fixably or removably affixed to the pressure shell by any conventional method to form a pressure tight seal. Devices of this type are known in the art. The direction of flow in a hollow fiber element can be counter-current rather than co-current or even transverse.

Industrial hollow fiber membrane modules typically comprise one or more membrane elements, each containing hundreds of thousands of individual hollow fibers. The number of fibers bundled together into a membrane element will depend on fiber diameters, lengths, and porosities and on desired throughput, equipment costs, and other engineering considerations understood by those in the chemical engineering arts.

Spiral Wound Membrane Element

As discussed above, a spiral wound membrane element is manufactured from polymer membranes formed into flat sheets.

A spiral wound membrane element includes a plurality of envelopes formed from two flat sheets of polymer membranes with a permeate spacer between them. The envelopes are open at one end and separated by feed spacers. The envelopes, along with their accompanying feed spacers, are wrapped around a perforated permeate tube. The open ends of the envelopes face the permeate tube.

In use, the natural gas feed stream can enter the side of the membrane element and travel through the feed spacers along the axis of the membrane element. $CO_2$ permeates into the envelopes and travels to the permeate tube. The $CO_2$ enters the permeate tube through its perforations. The components that do not permeate the envelopes leave the membrane element at the side opposite to the natural gas feed stream.

Flat Stack Permeator

Polymer membranes formed into flat sheets can be used to fabricate a flat stack permeator that includes a multitude of membrane layers alternately spaced by feed-retentate spacers and permeate spacers. The layers can be glued along their edges to define separate feed-retentate zones and permeate zones. Devices of this type are described in U.S. Pat. No. 5,104,532, the contents of which are herein incorporated by reference in their entirety.

Composite Membrane

The polymer membranes may be composite polymer membranes, which are also known as multi-layer membranes. A composite polymer membrane is made of a thin selective (dense) layer of one polymer that is supported by a porous support membrane layer of the same polymer or another polymer (e.g. a less expensive polymer). The thin selective layer is optimized for the particular gas separation. Accordingly, if the polymer membranes are composite polymer membranes, the thin selective layer is made of the crosslinked polyimide polymer as described herein.

Hollow fibers are typically formed from composite polymer membranes. To maximize productivity, the hollow fibers typically include an ultrathin (<2000 Angstroms) "skin" layer on a porous support. Gas separation is accomplished through this selective "skin." This outer "skin" layer may be supported on the same polymer to form an integrally skinned asymmetric hollow fiber membrane. The most advanced membranes have an asymmetric sheath with the selective skin supported on an inexpensive porous core layer (different polymer) to form a composite hollow fiber membrane. This type of device is described in U.S. Pat. No. 5,085,676, the contents of which are incorporated by reference herein in its entirety.

Flat sheets may also be formed from composite polymer membranes.

Hollow Fiber Membrane Element

As discussed above, a hollow fiber membrane element is manufactured from polymer membranes formed into hollow fibers.

A hollow fiber membrane element can include hollow fibers wrapped around a perforated central tube with both ends of the fibers open to a permeate pot. In use, the associated gas feed stream can flow over and between the fibers. $CO_2$ permeates into the hollow fibers and travels along the bores of the hollow fibers to the permeate pot. The $CO_2$ can then exit the permeate pot through a permeate pipe. Components in the associated gas feed stream that do not permeate into the hollow fibers eventually reach the perforated central tube, which collects these non-permeating components.

A hollow fiber membrane element can also include hollow fibers in bundled arrays potted at either end to form tube sheets and fitted into a pressure vessel thereby isolating the insides of the fibers (bore/tube-side) from the outsides of the fibers (shell-side). The fibers are held together by any conventional means. Typically one end of the fiber bundle extends to one end of the pressure shell and the opposite end of the fiber bundle extends to the opposite end of the pressure shell. The fiber bundle is fixably or removably affixed to the pressure shell by any conventional method to form a pressure tight seal. Devices of this type are known in the art. The direction of flow in a hollow fiber element can be counter-current rather than co-current or even transverse.

Industrial hollow fiber membrane modules typically comprise one or more membrane elements, each containing hundreds of thousands of individual hollow fibers. The number of fibers bundled together into a membrane element will depend on fiber diameters, lengths, and porosities and on desired throughput, equipment costs, and other engineering considerations understood by those in the chemical engineering arts.

Apparatus for Producing a $CO_2$ Depleted Product Gas Stream

As discussed above, the higher permeance of the particular crosslinked polyimide polymer membranes distinguishes them from prior art membranes. However, with shell-side feed to hollow fibers, higher permeance causes the pressure drop in the bore of the fibers to increase. This is undesirable for separation productivity and efficiency. Rather, it is desirable to minimize pressure drop in the bore of the fiber.

To minimize pressure drop in the bore of the fiber, fiber length can be shortened or bore diameter can be increased. Thus, with the crosslinked polyimide polymer membranes, there are certain combinations of fiber lengths and bore diameters that are more preferable than others. The prior art membranes do not benefit from these same combinations since their permeance is significantly lower than the permeance of the crosslinked polyimide polymer membranes.

Accordingly, further disclosed herein is an apparatus incorporating the membranes made from the particular crosslinked polyimide polymer. The apparatus can utilize the polymer membranes to produce a $CO_2$ depleted product gas stream from a associated gas feed stream. The apparatus comprises one or more membrane modules. Each membrane module comprises one or more membrane elements. Each membrane element comprises a plurality of polymer membranes formed into hollow fibers. The polymer membranes comprise a crosslinked polyimide polymer having covalent ester crosslinks and have a permeance of at least 20 GPU and a $CO_2/CH_4$ selectivity of greater than 20, at 35° C. and a feed pressure of 100 psia. Importantly, the hollow fibers have a bore diameter greater than about 25 microns and a fiber length of less than about 15 feet.

In one embodiment, the hollow fibers have a bore diameter greater than about 50 microns. In another embodiment, the hollow fibers have a bore diameter greater than about 100 microns. In yet another embodiment, the hollow fibers have a fiber length less than about 10 feet.

As discussed above, multiple membrane modules are generally mounted on skids. Accordingly, since the apparatus comprises one or more membrane modules, a plurality of membrane modules may be mounted on a skid.

Due to the higher $CO_2$ permeance and higher $CO_2/CH_4$ selectivity of the crosslinked polyimide polymer membranes, the present apparatus is advantageous because it is generally lighter in weight and smaller in size than similar apparatus incorporating prior art membranes having lower $CO_2$ permeance and lower $CO_2/CH_4$ selectivity.

B. Gas Conversion Plant

Below are three examples of how hybrid or bi-functional catalysts may be made and arranged in a syngas conversion reactor.

1. Integral Catalyst U.S. patent application Ser. No. 12/343,534, entitled Zeolite Supported Cobalt Hybrid Fischer-Tropsch Catalyst, describes an integral catalyst that be used in a single bed in conversion reactor to convert synthesis gas to a product including synthetic crude oil. The contents of this disclosure are hereby incorporated by reference in its entirety.

2. Stacked Bed Catalysts U.S. Ser. No. 12/780,672, entitled Process of Synthesis Gas Conversion to Liquid Hydrocarbons using Synthesis Gas Conversion Catalyst and Hydroisomerization Catalyst, discloses a stacked bed arrangement of catalysts that be used in a conversion reactor. The contents of this disclosure are hereby incorporated by reference in its entirety into the present application.

3. Mixed Bed Catalysts U.S. patent Ser. No. 12/621,385, entitled Process of Synthesis Gas Conversion to Liquid Fuels Using Mixture of Synthesis Gas Conversion Catalyst and Dual Functionality Catalyst, describes a mixed bed arrangement of catalysts that can be used in a conversion reactor. The contents of this disclosure are hereby incorporated herein by reference in its entirety.

What is claimed is:

1. A process for producing synthetic crude oil from produced fluids of an offshore oil well, the process comprising:
   separating an associated gas stream from produced fluids received from at least one hydrocarbon producing well;
   adding heat to the associated gas stream;
   separating the heated associated gas stream using a membrane unit comprising a plurality of polymer membranes to provide a $CO_2$ enriched permeate stream and a $CO_2$ depleted product gas stream;
   converting the $CO_2$ depleted gas product stream into a synthetic crude oil using a gas conversion plant;
   wherein the separating of the heated associated gases into the $CO_2$ enriched permeate and a $CO_2$ depleted product gas stream is performed at a temperature of at least 80° C.; and
   reinjecting at least a portion of the $CO_2$ enriched permeate into a subterranean formation.

2. The process of claim 1 wherein:
   the separating of the heated associated gases into the $CO_2$ enriched permeate and a $CO_2$ depleted product gas stream is performed at between 80° C. and 125° C.

3. The process of claim 1 wherein:
   the separating of the heated associated gases into the $CO_2$ enriched permeate and a $CO_2$ depleted product gas stream is performed at between 80° C. and 150° C.

4. The process of claim 1 wherein:
   the heat added to the associated gas is received from the gas conversion plant.

5. The process of claim 1 wherein:
   the gas conversion plant includes a synthetic gas unit for making synthetic gas and a gas conversion unit for converting the synthetic gas into synthetic crude oil; and
   the gas conversion unit includes a catalyst comprising a synthesis gas conversion component and an acidic component and the synthesis gas is converted in the presence of the catalyst into an effluent comprising gaseous components, water and liquid hydrocarbons having a cloud point less than about 15° C. as determined by ASTM D 2500-09; and
   gases are removed from the liquid hydrocarbons to produce a stabilized synthetic crude oil.

6. The process of claim 1 wherein:
   the polymer is a glassy polymer and has a glass transition temperature of at least 300° C.

7. The process of claim 1 wherein:
   $CO_2$ enriched permeate has at least 95% $CO_2$ by volume.

8. The process of claim 1 wherein:
   the pressure of the $CO_2$ depleted gas product is reduced prior to the gas product being converted by the gas conversion plant into synthetic crude oil.

* * * * *